(12) United States Patent
Maher et al.

(10) Patent No.: US 9,077,557 B2
(45) Date of Patent: Jul. 7, 2015

(54) DATA-ON-SUPPLY REPEATER

(71) Applicants: Gregory A. Maher, Cape Elizabeth, ME (US); Tyler Daigle, Portland, ME (US)

(72) Inventors: Gregory A. Maher, Cape Elizabeth, ME (US); Tyler Daigle, Portland, ME (US)

(73) Assignee: Fairchild Semiconductor Corporation, San Jose, CA (US)

( * ) Notice: Subject to any disclaimer, the term of this patent is extended or adjusted under 35 U.S.C. 154(b) by 267 days.

(21) Appl. No.: 13/766,305

(22) Filed: Feb. 13, 2013

(65) Prior Publication Data

US 2014/0226697 A1   Aug. 14, 2014

(51) Int. Cl.
*H04L 12/28*  (2006.01)
*H04L 12/40*  (2006.01)
*H04B 3/36*   (2006.01)

(52) U.S. Cl.
CPC ............ *H04L 12/40006* (2013.01); *H04B 3/36* (2013.01); *H04L 12/40045* (2013.01)

(58) Field of Classification Search
CPC .................. H04L 12/40006; H04L 12/40045; H04B 3/36
See application file for complete search history.

(56) References Cited

U.S. PATENT DOCUMENTS

| | | | | |
|---|---|---|---|---|
| 6,967,414 | B1 * | 11/2005 | Wedding et al. | 307/9.1 |
| 2004/0223617 | A1 * | 11/2004 | Corcoran et al. | 380/266 |
| 2006/0017324 | A1 * | 1/2006 | Pace et al. | 307/3 |
| 2012/0189042 | A1 * | 7/2012 | Varadarajan et al. | 375/222 |

FOREIGN PATENT DOCUMENTS

| | | |
|---|---|---|
| CN | 103986500 A | 2/2014 |
| KR | 1020140102153 A1 | 8/2014 |

OTHER PUBLICATIONS

"Chinese Application Serial No. 201420064977.5, Office Action mailed May 21, 2014", 3 pgs.

* cited by examiner

*Primary Examiner* — Clemence Han
(74) *Attorney, Agent, or Firm* — Schwegman Lundberg & Woessner, P.A.

(57) ABSTRACT

This application discusses methods and apparatus for a data-on-supply repeater. In an example, a repeater can include a repeater circuit configured to receive a power signal at an input and to provide a representation of a received analog data signal at an output, a direction detector configured to receive the power signal from a first bus conductor of a plurality of bus conductors, to identify the first buss conductor of the plurality of bus conductors as a transmitting conductor, and to provide an output indicative of the transmitting conductor, a first input multiplexer configured to couple the transmitting conductor to the input of the repeater circuit in response to the output of the direction detector, and an output multiplexer configured to couple the output of the repeater circuit to a second bus conductor of the plurality of bus conductors, wherein the second bus conductor is different than the transmitting conductor.

20 Claims, 3 Drawing Sheets

DATA-ON-SUPPLY REPEATER

OVERVIEW

This application discusses, among other things, methods and apparatus for a data-on-supply repeater. In an example, a repeater can include a repeater circuit configured to receive a power signal at an input and to provide a representation of a received analog data signal at an output, a direction detector configured to receive the power signal from a first bus conductor of a plurality of bus conductors, to identify the first buss conductor of the plurality of bus conductors as a transmitting conductor, and to provide an output indicative of the transmitting conductor, a first input multiplexer configured to couple the transmitting conductor to the input of the repeater circuit in response to the output of the direction detector, and an output multiplexer configured to couple the output of the repeater circuit to a second bus conductor of the plurality of bus conductors, wherein the second bus conductor is different than the transmitting conductor.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
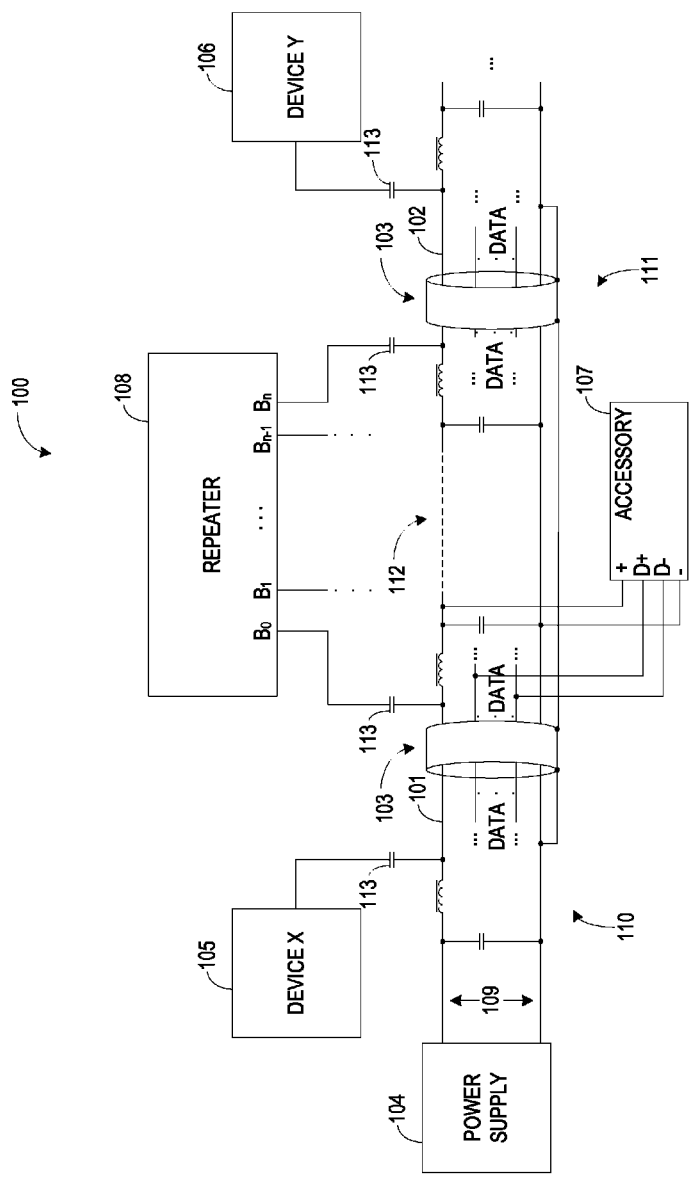
FIG. 1 illustrates generally an example system that can communicate data on supply conductors of a bus.

FIG. 1 illustrates an example system 100 that can communicate data on supply conductors 101, 102 of a bus 103. In certain examples, the system 100 can include a power supply 104, a first device 105 (DEVICE X) such as a provider device, a second device 106 (DEVICE Y) such as a consumer device, an accessory 107, a repeater 108 and a bus 103. A provider device can include devices capable of providing power on the bus 103 of the system 100. A consumer device can include devices that consume power from the bus 103 of the system 100. In certain examples, one or more of the first device 105, the second device 106, the accessory 107 and the repeater 108 can be a provider/consumer device. A provider/consumer device can consume power from the bus 103 and also has the capability to provide power onto the bus 103.

The bus 103 can include a power bus 109 to receive power from a power supply or provider device and to provide power to a consumer device. In some examples, a provider device can include a power supply. In some examples, the bus 103 can include one or more data lines (DATA). In certain examples, the power bus 109 of the bus 103 can be segmented 110, 111. In certain examples, power bus segments 110, 111 can be coupled 112. In some examples, power bus segments can be selectively coupled using a transistor.

In the illustrated example, the first and second devices 105, 106 can communicate data via the power bus 109 of the bus 103. In some examples, an analog data signal can be coupled with the power bus 109 via a high frequency coupling capacitor 113. In certain examples, the data communicated over the power bus 109 can be modulated using frequency shift keying (FSK) techniques. In certain examples, data can be communicated over the power bus 109 according to a standard such as a Universal Serial Bus (USB) Power Delivery (PD) specification.

The present inventors have recognized that expanded use of communicating data over a power bus 109, or data-on-supply, can be realized using a repeater 108. In addition, the inventors have realized a simple repeater architecture that can be implemented in an integrated circuit and that can be used in a variety of applications that include a power bus. In certain examples, an integrated repeater can be configured to run on about 20 milliamps while waiting for an analog data signal and about 30 mA when processing or repeating an analog data signal.

Figure 2:
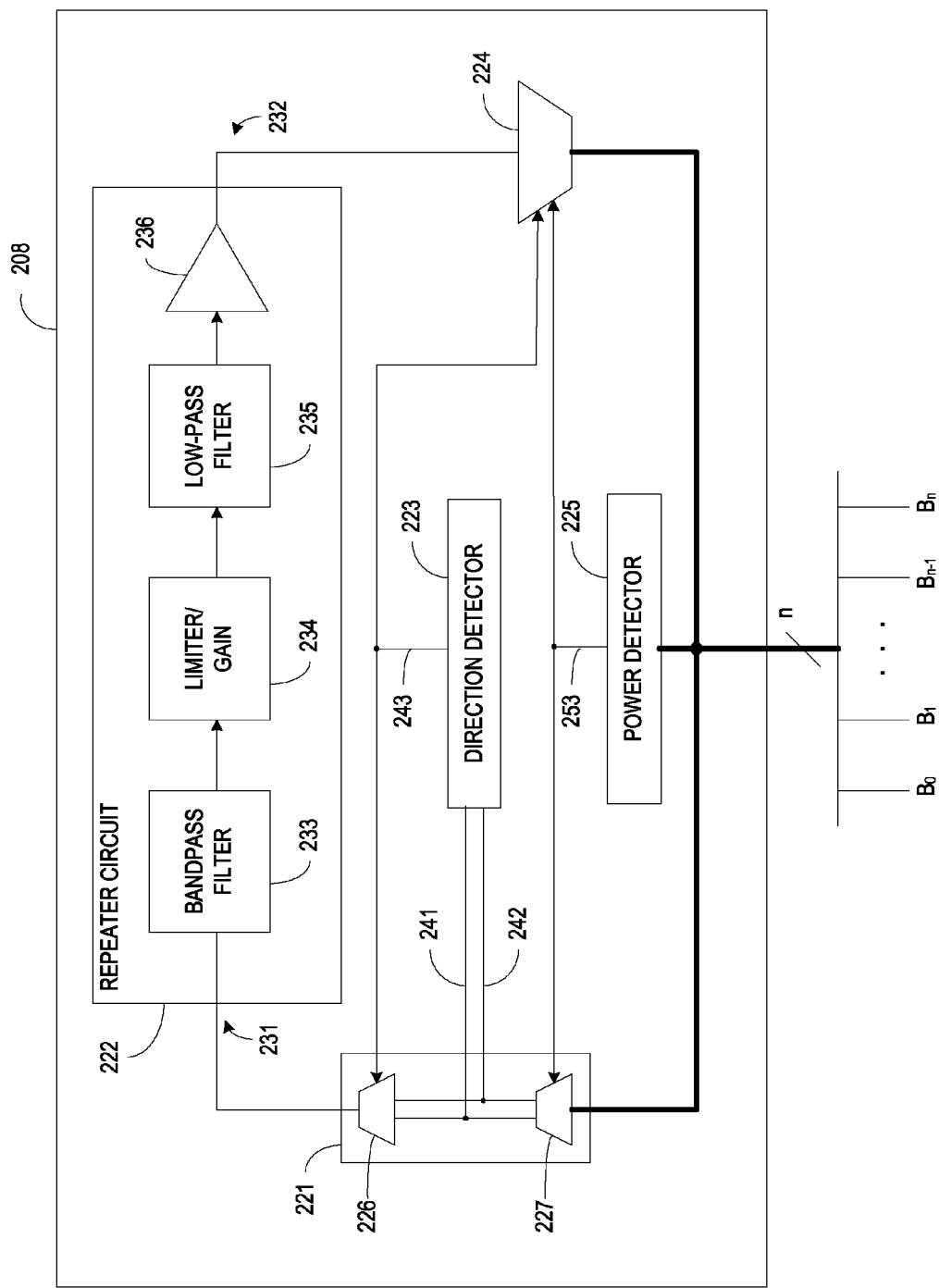
FIG. 2 illustrates generally an example repeater coupled to one or more power buses or bus segments.

FIG. 2 illustrates generally an example repeater 208 coupled to one or more power buses or bus segments ($B_0$-$B_n$). In certain examples, the repeater 208 can include an input multiplexer circuit 221, a repeater circuit 222, a direction detector 223 and an output multiplexer 224. The repeater 208 can also include a controller (not shown). In certain examples, the controller can be simple such as a controller capable of providing a simple three-state, state machine. In some examples, the repeater 208 can operate in cooperation with one or more external, high-pass filters to receive and to transmit an analog data signal on the conductors of the power buses ($B_0$-$B_n$). In certain examples, a high pass filer can include a coupling capacitor coupled to a power bus.

In an example, the repeater 208 can be implemented to couple between two or more devices configured to communicate using a power bus. In certain examples, the power bus can be associated with a bus that includes both a power bus and a communication bus such as a Universal Serial Bus (USB) system. In some examples, the repeater 208 can be configured to couple between two or more devices coupled to different power bus segments associated with a communication bus.

In certain examples, the repeater circuit 222 can receive an analog data signal at an input 231 and can generate a representation of the analog data signal at an output 232. In certain examples, the analog data signal can include a frequency-shift keyed data signal for communicating data between two or more devices using the conductors of the power bus. In an example, the repeater circuit 222 can include a DC restore circuit (not shown) to reference the analog data signal. In some examples, the DC restore circuit can include a voltage divider. In an example, the repeater circuit 222 can include a band-pass filter 233 to isolate frequencies associated with the analog data signal, a limit and gain circuit 234, a low pass filter 235 and a driver 236 coupled in series to receive the analog data signal and to generate a representation of the analog data signal at the output 232 of the repeater circuit 222. In certain examples, the analog data signal can get corrupted with noise from devices coupled to the power bus. The repeater circuit 222 can receive the analog data signal and can generate a representation of the analog data signal that does not include the noise, or includes attenuated representations of the noise.

In certain examples, the band-pass filter 233 can include a Butterworth band-pass filter such as, but not limited to, a $6^{th}$ order Butterworth band-pass filter. In certain examples, the band-pass filter can be configured to pass frequencies in a range of about 20 megahertz (MHz) to about 25 MHz. In some examples, the band-pass filter can be configured to bass frequencies from about 22.4 MHz to about 24 MHz. In some examples, the band-pass filter can be optimized around about 23.2 MHz or about 22.86 MHz. In certain examples, the low-pass filter 235 can provide a command signal representative of the analog data signal to the driver 236. In some examples, the low-pass filter can include a Saleen-Key low pass filter such as, but not limited to, a $7^{th}$-order Saleen-Key low-pass filter.

In certain examples, the repeater 208 can include a direction detector 223. The direction detector 223 can monitor two or more bus conductors 241, 242 for an analog data signal and can provide an indication 243 of which conductor includes the analog data signal. In certain examples, the indication 243 can be used to identify, for example, a first bus conductor 241, or a first supply conductor, as a transmitting conductor. In certain examples, the indication 243 can be used to couple the transmitting conductor to the input 231 of the repeater circuit. In certain examples, the indication can be used to couple a second bus conductor 242 to the output 232 of the repeater device. At a different time, the direction detector 223 can detect an analog signal on the second bus conductor 242 and can provide the indication 243 identifying the second bus conductor 242 as the transmitting conductor. The indication 243 can then be used to couple the second bus conductor 242 to the input 231 of the repeater circuit 222 and to couple the first bus conductor 241 to the output 232 of the repeater circuit 222. In certain examples, the direction detector can detect the conclusion of a data transmission by detecting the absence of an analog signal on the identified transmitting conductor for a predetermined interval. In certain examples, the predetermined interval can be between about 5 microseconds (μsec) and about 20 μsec. In certain examples, the direction detection sensitivity, or squelch detection as it is sometimes referred, can be configured to about 35 millivolts RMS ($mV_{RMS}$) to about 55 $mV_{RMS}$.

In certain examples, the repeater 208 can include a power detector 225. Upon power up of the repeater 208, the power detector 225 can monitor each of a number of power bus conductors ($B_0$-$B_n$) and can provide an indication 253 of which conductor includes a first-occurring power signal. In certain examples, the indication 253 of the power bus conductor having the first-occurring power signal can be used to couple one or more power bus conductors to the direction detector 223. In some examples, the indication of the power bus conductor having the first-occurring power signal can be used to couple that power bus conductor to the direction detector 223. In certain examples, the indication of the power bus conductor having the first-occurring power signal can be used to couple a second power bus conductor to the direction detector 223. In certain examples, the second power bus conductor can be a predetermined, corresponding, power bus conductor associated with the power bus conductor identified using the power detector circuit. In some examples, the second power bus conductor can be identified using a programmable parameter.

In certain examples, the input multiplexer circuit 221 can couple one of a plurality of bus conductors ($B_0$-$B_n$) to the input 231 of the repeater circuit 222. In some examples, the input multiplexer circuit 221 can include a first input multiplexer 226 responsive to the indication 243, or output, of the direction detector 223. In an example, in response to a first state of the output of the direction detector 223, the first input multiplexer 226 can couple a first bus conductor to the input 231 of the repeater circuit 222 while isolating a second bus conductor from the input 231 of the repeater circuit 222. In response to a second state of the output of the direction detector 223, the first input multiplexer 226 can couple the second bus conductor to the input 231 of the repeater circuit 222 while isolating the first bus conductor from the input 231 of the repeater circuit 222.

In certain examples, the input multiplexer circuit 221 can include a second input multiplexer 227 responsive to the indication 253, or output, of the power detector 225. In some examples, the second input multiplexer 227 can couple one or more bus conductors to the first input multiplexer 226. In certain examples, at least one of the bus conductors selected by the second input multiplexer 227 to be coupled to the first input multiplexer 226 can include a bus conductor identified by the power detector 225 as having a first-occurring power signal after power up of the repeater 208.

In certain examples, the output multiplexer 224 can selectively couple the output 232 of the repeater circuit 222 with at least one of a plurality of bus conductors ($B_0$-$B_n$) such that the repeater circuit 222 can transmit the representation of the analog data signal. In certain examples, the output multiplexer 224 can be responsive to the output of the direction detector 223, the output of the power detector 225, a programmable parameter of the controller (not shown), or a combination thereof. In certain examples, the repeater 208 can include a programmable output selector to accept an output bus selection. The output multiplexer 224 can be configured to couple the second bus conductor of the plurality of bus conductors ($B_0$-$B_n$) to the output 232 of the repeater 208 in response to the output bus selection.

In certain examples, the repeater 208 can receive power from one of the plurality of bus conductors ($B_0$-$B_n$) or from a power source that is independent of the bus conductors ($B_0$-$B_n$). In certain examples, the repeater 208 can include a voltage regulator (not shown) to provide one or more reference voltages for the repeater circuit 222, the direction detector 223 and the power detector 225. In certain examples, the sequencing of the operation of the input multiplexer circuit 221 and the output multiplexer 224 can be controlled by the state machine.

Figure 3:
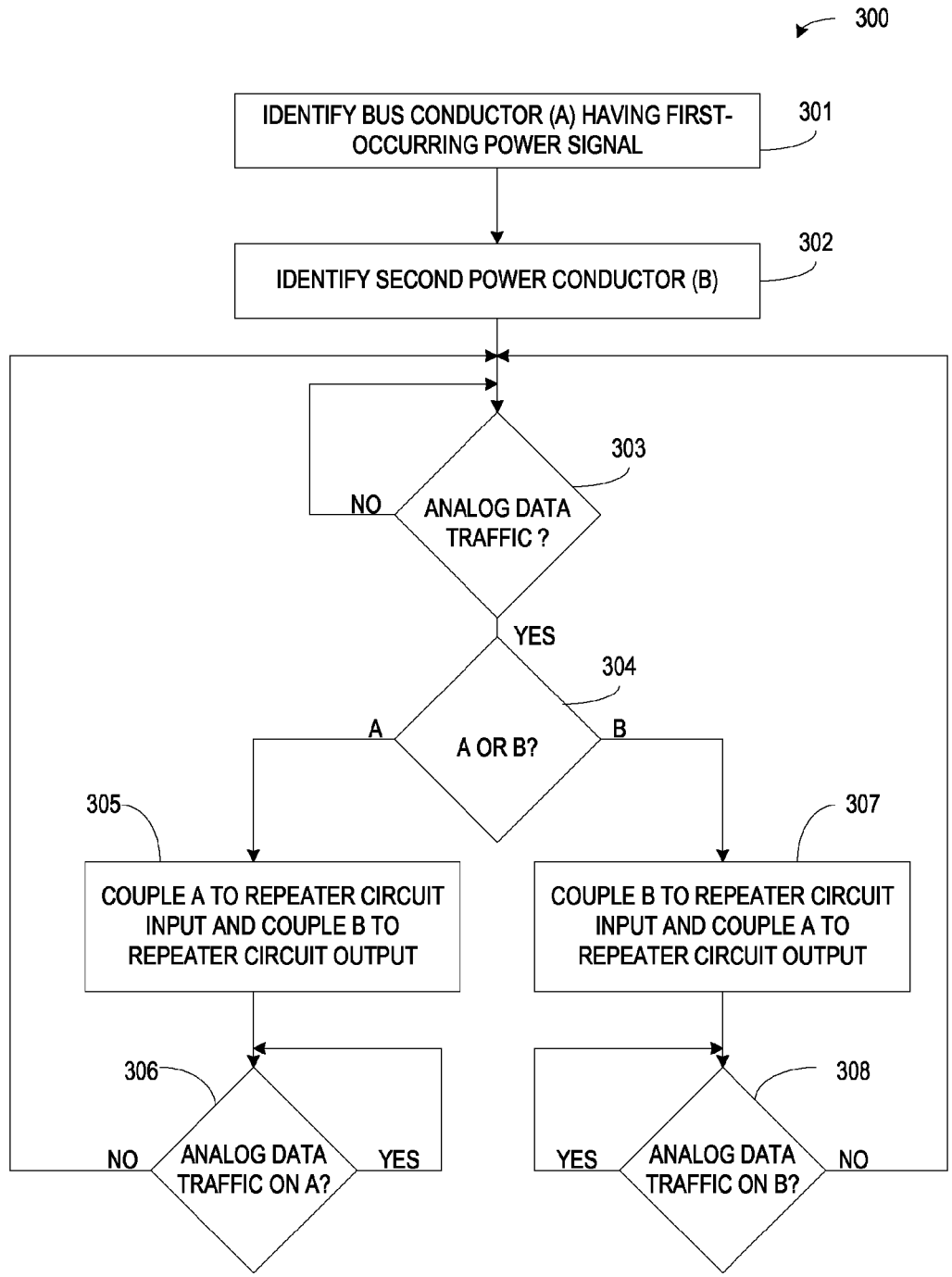
FIG. 3 illustrates generally a flow chart of an example state machine method for a data-on supply repeater.

FIG. 3 illustrates generally a flow chart of an example state machine method. At 301, a first power conductor having a first occurring power signal is identified using a power detector. At 302, a second power conductor is identified using one of a predetermined setting or a programmable setting. At 303, the state machine loops in an idle state until an analog data signal is detected on one of the first or second bus conductors. At 304, the bus conductor with the analog data signal traffic is identified as either the first bus conductor or the second bus conductor using a direction detector. At 305, if the first conductor is identified as having the analog data signal, the first conductor can be coupled to the input of a repeater circuit and the second conductor can be coupled to the output of the repeater circuit using input and output multiplexers. At 306, the state machine can idle while the analog data signal is repeated from the first conductor to the second conductor. At 306, when analog data signal traffic ceases for a predetermined interval on the first conductor, the state machine can return to the idle state at 303 and can wait for the next analog data signal. At 307, if the second conductor is identified as having the analog data signal, the second conductor can be coupled to the input of a repeater circuit and the first conductor can be coupled to the output of the repeater circuit using the input and output multiplexers. At 308, the state machine can idle while the analog data signal is repeated from the second conductor to the first conductor. At 308, when analog data signal traffic ceases for a predetermined interval on the second conductor, the state machine can return to the idle state at 303 and can wait for the next analog data signal.

In certain examples, a data-on-supply repeater as described above can be implemented with very little digital data interaction to control data communication over a power supply path. In an example, a repeater according to the present subject matter can be implemented within or parallel with a load switch of a power bus. IN certain application, a repeater according to the present subject matter can be utilized as a cross-point switch to route data from one bus power supply to another bus power supply. For mobile communication devices, such as mobile communication devices that include USB, a repeater according to the present subject matter does not need to utilize or interact with baseband resources.

ADDITIONAL NOTES

In Example 1, an apparatus can include a repeater circuit configured to receive a power signal at an input, the power signal including an analog data signal, and to provide a representation of the received analog data signal at an output, a direction detector configured to receive the power signal from a first bus conductor of a plurality of bus conductors, to identify the first buss conductor of the plurality of bus conductors as a transmitting conductor, and to provide an output indicative of the transmitting conductor, a first input multiplexer configured to couple the transmitting conductor to the input of the repeater circuit in response to the output of the direction detector, and an output multiplexer configured to couple the output of the repeater circuit to a second bus conductor of the plurality of bus conductors, wherein the second bus conductor is different than the transmitting conductor.

In Example 2, the apparatus of Example 1 optionally includes a power bus detector configured to couple to the plurality of bus conductors, to identify a first-occurring power signal on one of the bus conductors, and to provide an output indicative of the bus conductor having the first-occurring power signal and a corresponding bus conductor.

In Example 3, the apparatus of any one or more of Examples 1-2 optionally includes a second input multiplexer configured to couple the bus conductor having the first-occurring power signal and the corresponding bus conductor to the direction detector.

In Example 4, the direction detector of any one or more of Examples 1-3 optionally is configured to identify one of the first-occurring power conductor or the corresponding conductor as the transmitting conductor.

In Example 5, the second bus conductor of any one or more of Examples 1-4 optionally is one of the first-occurring power conductor or the corresponding conductor.

In Example 6, the analog data signal of any one or more of Examples 1-5 optionally is modulated on the power signal using frequency-shift keying (FSK).

In Example 7, the corresponding bus conductor of any one or more of Examples 1-6 optionally is a predetermined bus conductor associated with the first bus conductor.

In Example 8, the apparatus of any one or more of Examples 1-7 optionally includes a programmable output selector configured to accept an output bus selection, wherein the output multiplexer is configured to couple the second bus conductor of the plurality of bus conductors to the output of the repeater in response to the output bus selection.

In Example 9, a method for communicating data over a power bus can include receiving a power signal including an analog data signal at an input of a repeater, providing a representation of the analog data signal at an output of the repeater, identifying a first bus conductor of a plurality of bus conductors conducting the power signal using a direction detector, coupling the first bus conductor of the plurality of bus conductors to the input of the repeater using a first input multiplexer responsive to an output of the direction detector, and coupling a second bus conductor of the plurality of bus conductors to the output of the repeater using an output multiplexer.

In Example 10, the method of any one or more of Examples 1-9 optionally includes detecting a first-occurring power signal on the one bus conductor of the plurality of bus conductors using a power detector, and coupling the one bus conductor of the plurality of bus conductors to the first input multiplexer using a second input multiplexer responsive to an output of the power detector.

In Example 11, the output multiplexer of any one or more of Examples 1-10 optionally is responsive to the output of the direction detector and the output of the power detector.

In Example 12, the method of any one or more of Examples 1-11 optionally includes sequencing operation of the first and second input multiplexers and the output multiplexer using a state machine.

In Example 13, the method of any one or more of Examples 1-12 optionally includes transitioning from a first state of the state machine to a second state of the state machine upon detecting the analog data signal on the first bus conductor.

In Example 14, the method of any one or more of Examples 1-13 optionally includes transitioning from the first state of the state machine to a third state of the state machine upon detecting a second analog data signal on the second bus conductor.

In Example 15, the method of any one or more of Examples 1-14 optionally includes transitioning from the second state of the state machine to the first state of the state machine upon detecting an absence of the analog data signal on the first conductor for a predetermined interval.

In Example 16, the method of any one or more of Examples 1-15 optionally includes referencing the analog data signal using a DC restore circuit, processing the analog data signal using a band-pass filter configured to isolate frequencies associated with the analog data signal and a low pass filter configured to generate a command signal representative of the analog data signal, receiving the command signal at an input of an output driver, and providing the representation of the analog data signal using the output driver and the command signal.

In Example 17, a system can include a power bus having a plurality of bus conductors configured to couple to a plurality of devices and a repeater configured to detect an analog data signal on a first bus conductor of the power bus and to provide a representation of the analog data signal on a second bus conductor of the power bus. The repeater can include a repeater circuit configured to receive from the power bus a power signal at an input of the repeater circuit, the power signal including the analog data signal, and to provide the representation of the analog data signal at an output of the repeater circuit, a direction detector configured to couple to first and second bus conductors of the plurality of bus conductors, to receive the power signal from one of the first or second buss conductors, to identify the first bus conductor as a transmitting conductor, and to provide an output indicative of the transmitting conductor, a first input multiplexer to couple the transmitting conductor to the input of the repeater circuit in response to the output of the direction detector, an output multiplexer configured to couple the output of the repeater circuit with the second bus conductor of the plurality of bus conductors, wherein the second bus conductor is different than the identified receiving conductor, a power bus detector configured to couple to the plurality of bus conductors, to identify a first-occurring power signal on the first bus conductor, and to provide an output indicative of the first bus conductor, and a second input multiplexer configured to couple the first bus conductor to the direction detector in response to the output of the power bus detector.

In Example 18, the repeater of any one or more of Examples 1-17 optionally is configured to detect a second analog data signal on the second bus conductor of the power bus and to provide a representation of the second analog data signal on the first bus conductor of the power bus.

In Example 19, the power bus of any one or more of Examples 1-18 optionally includes a Universal Serial Bus (USB) power bus.

In Example 20, the analog data signal and the representation of the analog data signal of any one or more of Examples 1-19 optionally include a data signal modulated on the power signal using frequency-shift keying.

Example 21 can include, or can optionally be combined with any portion or combination of any portions of any one or more of Examples 1 through 20 to include, subject matter that can include means for performing any one or more of the functions of Examples 1 through 20, or a machine-readable medium including instructions that, when performed by a machine, cause the machine to perform any one or more of the functions of Examples 1 through 20.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An apparatus comprising:
    a repeater circuit configured to receive a power signal at an input, the power signal including an analog data signal, and to provide a representation of the received analog data signal at an output;
    a direction detector configured to receive the power signal from a first bus conductor of a plurality of bus conductors, to identify the first bus conductor of the plurality of bus conductors as a transmitting conductor, and to provide an output indicative of the transmitting conductor;
    a first input multiplexer configured to couple the transmitting conductor to the input of the repeater circuit in response to the output of the direction detector; and
    an output multiplexer configured to couple the output of the repeater circuit to a second bus conductor of the plurality of bus conductors, wherein the second bus conductor is different than the transmitting conductor.

2. The apparatus of claim 1, including a power bus detector configured to couple to the plurality of bus conductors, to identify a first-occurring power signal on one of the bus conductors, and to provide an output indicative of the bus conductor having the first-occurring power signal and a corresponding bus conductor.

3. The apparatus of claim 2, including a second input multiplexer configured to couple the bus conductor having the first-occurring power signal and the corresponding bus conductor to the direction detector.

4. The apparatus of claim 2, wherein the direction detector is configured to identify one of the first-occurring power conductor or the corresponding conductor as the transmitting conductor.

5. The apparatus of claim 2, wherein the second bus conductor is one of the first-occurring power conductor or the corresponding conductor.

6. The apparatus of claim 1, wherein the analog data signal is modulated on the power signal using frequency-shift keying (FSK).

7. The apparatus of claim 1, wherein the corresponding bus conductor is a predetermined bus conductor associated with the first bus conductor.

8. The apparatus of claim 1, including:
    a programmable output selector configured to accept an output bus selection; and
    wherein the output multiplexer is configured to couple the second bus conductor of the plurality of bus conductors to the output of the repeater in response to the output bus selection.

9. A method for communicating data over a power bus, the method comprising:
    receiving a power signal including an analog data signal at an input of a repeater;
    providing a representation of the analog data signal at an output of the repeater;
    identifying a first bus conductor of a plurality of bus conductors conducting the power signal using a direction detector;
    coupling the first bus conductor of the plurality of bus conductors to the input of the repeater using a first input multiplexer responsive to an output of the direction detector; and
    coupling a second bus conductor of the plurality of bus conductors to the output of the repeater using an output multiplexer.

10. The method of claim 9, including detecting a first-occurring power signal on the one bus conductor of the plurality of bus conductors using a power detector; and
coupling the one bus conductor of the plurality of bus conductors to the first input multiplexer using a second input multiplexer responsive to an output of the power detector.

11. The method of claim 10, wherein the output multiplexer is responsive to the output of the direction detector and the output of the power detector.

12. The method of claim 10, including sequencing operation of the first and second input multiplexers and the output multiplexer using a state machine.

13. The method of claim 12 including transitioning from a first state of the state machine to a second state of the state machine upon detecting the analog data signal on the first bus conductor.

14. The method of claim 13, including transitioning from the first state of the state machine to a third state of the state machine upon detecting a second analog data signal on the second bus conductor.

15. The method of claim 13, including transitioning from the second state of the state machine to the first state of the state machine upon detecting an absence of the analog data signal on the first bus conductor for a predetermined interval.

16. The method of claim 15 including:
referencing the analog data signal using a DC restore circuit;
processing the analog data signal using a band-pass filter configured to isolate frequencies associated with the analog data signal and a low pass filter configured to generate a command signal representative of the analog data signal;
receiving the command signal at an input of an output driver; and
providing the representation of the analog data signal using the output driver and the command signal.

17. A system comprising:
a power bus having a plurality of bus conductors configured to couple to a plurality of devices; and
a repeater configured to detect an analog data signal on a first bus conductor of the power bus and to provide a representation of the analog data signal on a second bus conductor of the power bus, wherein the repeater includes:
a repeater circuit configured to receive from the power bus a power signal at an input of the repeater circuit, the power signal including the analog data signal, and to provide the representation of the analog data signal at an output of the repeater circuit;
a direction detector configured to couple to the first and second bus conductors of the plurality of bus conductors, to receive the power signal from one of the first or second bus conductors, to identify the first bus conductor as a transmitting conductor, and to provide an output indicative of the transmitting conductor;
a first input multiplexer to couple the transmitting conductor to the input of the repeater circuit in response to the output of the direction detector;
an output multiplexer configured to couple the output of the repeater circuit with the second bus conductor of the plurality of bus conductors, wherein the second bus conductor is different than the identified transmitting conductor;
a power bus detector configured to couple to the plurality of bus conductors, to identify a first-occurring power signal on the first bus conductor, and to provide an output indicative of the first bus conductor; and
a second input multiplexer configured to couple the first bus conductor to the direction detector in response to the output of the power bus detector.

18. The system of claim 17, wherein the repeater is configured to detect a second analog data signal on the second bus conductor of the power bus and to provide a representation of the second analog data signal on the first bus conductor of the power bus.

19. The system of claim 17, wherein the power bus includes a Universal Serial Bus (USB) power bus.

20. The system of claim 17, wherein the analog data signal and the representation of the analog data signal include a data signal modulated on the power signal using frequency-shift keying.

* * * * *